(12) United States Patent
Kolmayer et al.

(10) Patent No.: US 8,866,315 B2
(45) Date of Patent: Oct. 21, 2014

(54) UNDERWATER ELECTRICITY GENERATION MODULE PROVIDED WITH A BASE

(75) Inventors: André Kolmayer, Paris (FR); Laurent Elie, Brest (FR); Eric Fusil, Kervignac (FR); Lucie Lebosse, Guidel-Plages (FR)

(73) Assignee: DCNS, Paris (FR)

( * ) Notice: Subject to any disclaimer, the term of this patent is extended or adjusted under 35 U.S.C. 154(b) by 306 days.

(21) Appl. No.: 13/499,440

(22) PCT Filed: Sep. 28, 2010

(86) PCT No.: PCT/FR2010/052040
§ 371 (c)(1),
(2), (4) Date: Oct. 12, 2012

(87) PCT Pub. No.: WO2011/039465
PCT Pub. Date: Apr. 7, 2011

(65) Prior Publication Data
US 2013/0020808 A1 Jan. 24, 2013

(30) Foreign Application Priority Data
Oct. 2, 2009 (FR) ..................... 09 56878

(51) Int. Cl.
*F02B 63/04* (2006.01)
*H02K 7/18* (2006.01)
*G21C 13/024* (2006.01)
*G21D 1/00* (2006.01)
*G21C 11/04* (2006.01)

(52) U.S. Cl.
CPC .............. *G21C 13/024* (2013.01); *Y02E 30/40* (2013.01); *G21D 1/00* (2013.01); *G21C 11/04* (2013.01)
USPC ........................................ 290/1 A

(58) Field of Classification Search
CPC ........ G21C 13/024; Y02E 30/40; H02K 7/18; H02K 7/1815; F02B 63/04; F02B 2063/045; F02B 75/16; F02B 63/044; G21D 1/00
USPC .......................................... 290/1 A
See application file for complete search history.

(56) References Cited

U.S. PATENT DOCUMENTS

| 3,413,960 | A | 12/1968 | Feliks et al. |
| 4,117,691 | A * | 10/1978 | Spray ............................. 405/205 |
| 4,302,291 | A | 11/1981 | Severs et al. |
| 5,247,553 | A | 9/1993 | Herring |
| 2012/0328069 | A1 * | 12/2012 | Kolmayer et al. ............ 376/320 |

FOREIGN PATENT DOCUMENTS

FR 2 310 522 A1 12/1976
FR 2 845 347 A1 4/2004

(Continued)

OTHER PUBLICATIONS

International Search Report, dated Jan. 28, 2011, from corresponding PCT application.

*Primary Examiner* — Javaid Nasri
(74) *Attorney, Agent, or Firm* — Young & Thompson

(57) ABSTRACT

The invention relates to an underwater electricity generation module provided with a base. The electricity generation module is of the type that comprises an elongate cylindrical casing (12) incorporating an electricity generation unit (25a, 25b) comprising a nuclear boiler (28, 29) associated with electricity generation means (30, 31) connected to an external electricity distribution post (7) by means of electric cables (6). The lower portion of the casing (12) is provided with a base (14) that rests on the bed of the water body and anchoring means (15) for anchoring the module (1) to the bed. The invention is characterised in that the base (14) is essentially in the form of a sledge which extends from one end of the casing (12) to the other and the ends (50, 51) of which are curved in the form of a spatula at each end of the casing (12), said base including zones for absorbing variations in the length of the casing (12), linked to the variation in the pressure applied thereto when submerged or surfaced.

13 Claims, 12 Drawing Sheets

(56) References Cited

FOREIGN PATENT DOCUMENTS

| | | |
|---|---|---|
| GB | 1 330 091 A | 9/1973 |
| JP | 50 018891 A | 2/1975 |
| JP | 11 038172 A | 2/1999 |
| WO | 82/01759 A1 | 5/1982 |
| WO | 00/24004 A1 | 4/2000 |

* cited by examiner

UNDERWATER ELECTRICITY GENERATION MODULE PROVIDED WITH A BASE

BACKGROUND OF THE INVENTION

The present invention relates to an underwater electricity generation module.

More particularly, the invention relates to an underwater electricity generation module that comprises an elongate cylindrical casing incorporating an electricity generation unit comprising a nuclear boiler associated with electricity generation means connected to an external electricity distribution post by means of electric cables.

Such modules are already known in the state of the art.

Reference may for example be made to documents U.S. Pat. No. 5,247,553, JP 50 018 891 and U.S. Pat. No. 4,302,291.

These various documents describe underwater electricity generation modules in which energy production means comprising a nuclear boiler can be integrated, for example.

It is known that such structures have a certain number of advantages, since nuclear energy is an efficient and profitable response to energy problems.

Such structures also make it possible to resolve a certain number of problems, in particular relative to natural risks, such as earthquakes or others, or human risks, such as terrorist attacks or ill-intentioned acts.

It is also known that these different projects have not resulted in industrial exploitations due to the fact that they have not been completely finalized.

SUMMARY OF THE INVENTION

The invention therefore aims to resolve these problems by proposing various improvements to this type of module.

To that end, the invention relates to an underwater electricity generation module comprising an elongate cylindrical casing incorporating an electricity generation unit comprising a nuclear boiler associated with electricity generation means connected to an external electricity distribution post by means of electric cables, the lower portion of the casing being provided with a base that rests on the bed of the water body and anchoring means for anchoring the module to the bed, characterized in that the base is essentially in the form of a sledge which extends from one end of the casing to the other and the ends of which are curved in the form of a spatula at each end of the casing, said base including zones for absorbing variations in the length of the casing, linked to the variation in the pressure applied thereto when submerged or surfaced.

According to other aspects of the invention, the underwater module comprises one or more of the following features:

- the sledge means comprise a beam-based structure including a central beam and two side beams, connected to one another by reinforcing and connecting arms, and the ends of which are bent and curved to be fastened to one another at the spatula-shaped end at each end of the casing,
- the side beams are connected to the module by support columns,
- the central beam comprises support block means for the module,
- the central beam comprises ballast means,
- the absorption zones of the length variations comprise telescoping portions of the beams, and
- the absorption zones of the length variations comprise elastically deformable bellows portions of the beams.

BRIEF DESCRIPTION OF THE DRAWINGS

The invention will be better understood using the following description, provided solely as an example and done in reference to the appended drawings, in which.

DESCRIPTION OF PREFERRED EMBODIMENTS

As previously indicated, the invention relates to an underwater electricity generation module.

Figure 1:
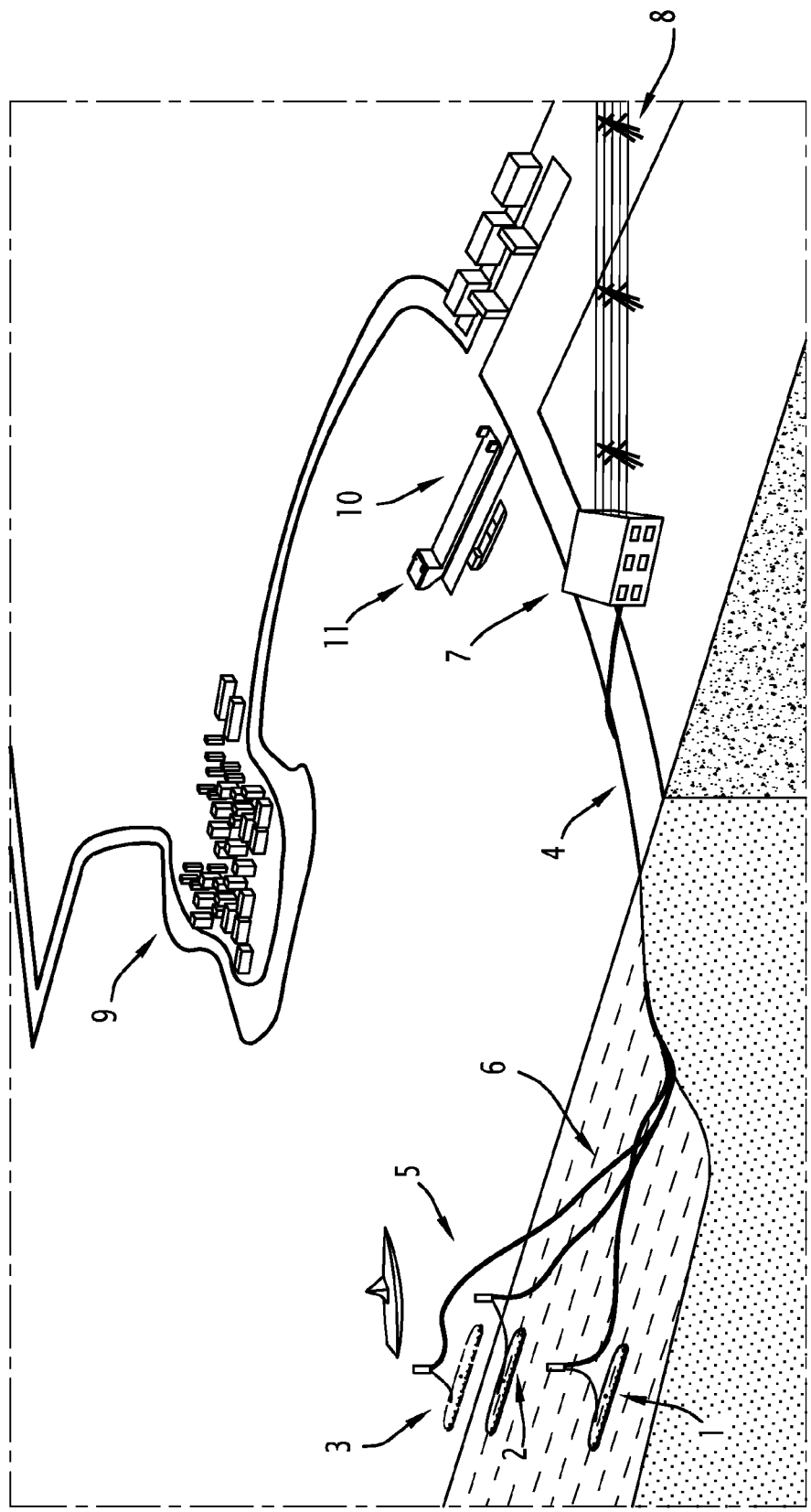
FIG. 1 shows a general view of an electricity generation site comprising underwater electricity generation modules according to the invention.

Such modules are for example illustrated in FIG. 1, and are for example designated by general references 1, 2 and 3 in that figure.

These modules are for example submerged off a coast designated by general reference 4, and they are placed on the bed of the water body or kept at some distance from the bed in an electricity generation site designated by general reference 5.

These different modules are then connected by electric cables designated by general reference 6, to an external electricity distribution post, also serving as control/command center away from the modules, said center for example being based on land and designated by general reference 7 in this figure.

This external electricity distribution post is then traditionally connected using electricity distribution lines designated by general reference 8, for example to an electricity distribution grid for example powering a town located nearby and designated by general reference 9.

It will also be noted that land infrastructure, such as, for example, a port designated by general reference 10, can be considered to house standby means such as, for example, standby ships, one of which is designated by general reference 11 in this figure, making it possible to intervene on the generation site. These standby means for example make it possible to place the modules, ensure that they are kept in good condition, or recover them for heavy operations to be performed on land.

Figure 2:
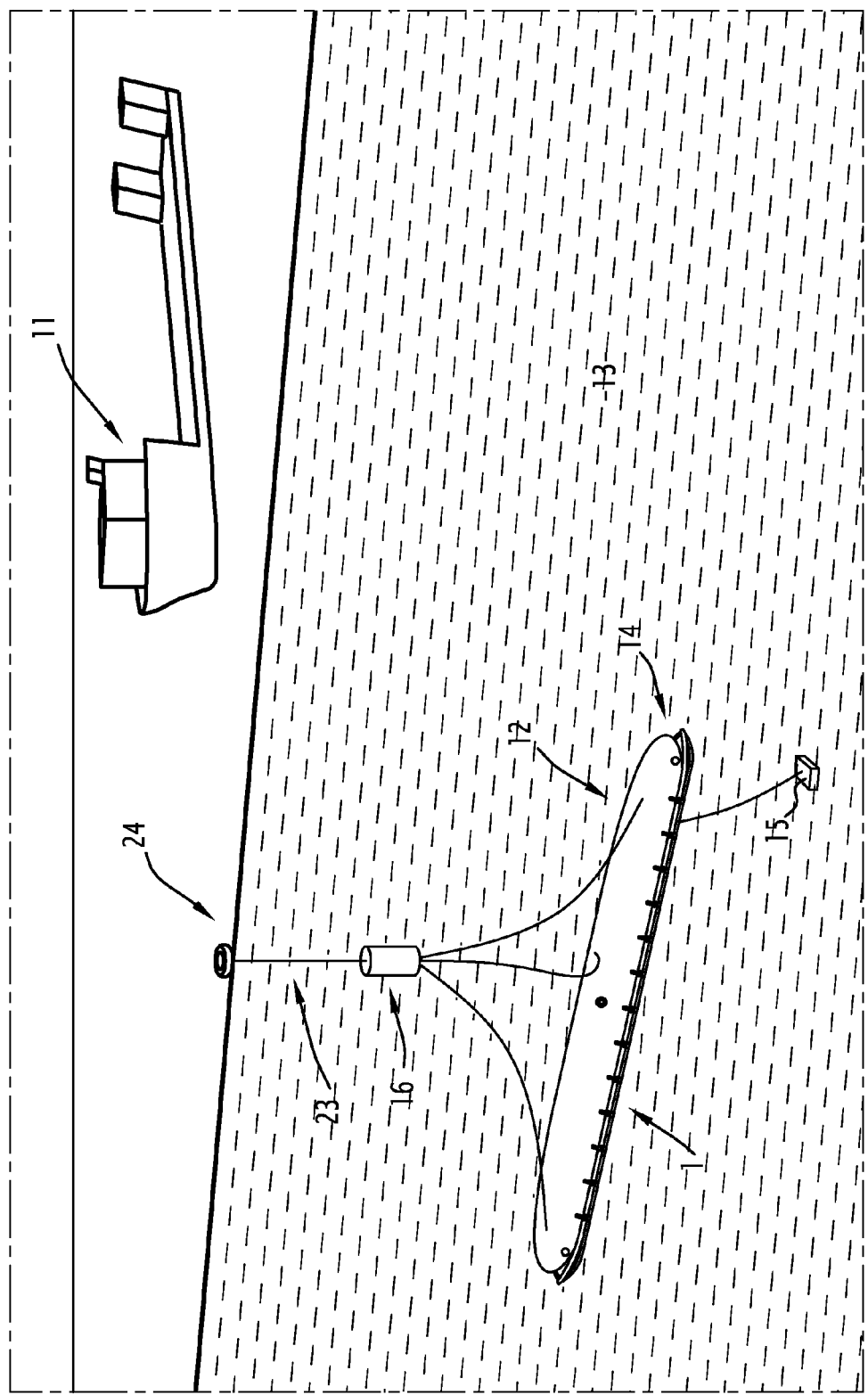
FIG. 2 shows a general view of an electricity generation module according to the invention, at sea.

In fact and as illustrated in FIG. 2, each underwater electricity generation module as designated by general reference 1 in said FIG. 2, comprises an elongate cylindrical casing, the ends of which are for example rounded. These means are designated by general reference 12 in this figure, and are placed on the bed of the water body or kept at some distance from the seabed, for example 13, and comprise, as will be described in more detail hereafter, a base designated by general reference 14 and anchoring means designated by general reference 15, making it possible to position and maintain said module on the bed.

As will also be described in more detail hereafter, this module can be associated with a submersible electrical connection unit designated by general reference 16, making it possible to connect the module to the electricity distribution post by means of electric cables.

A standby ships such as, for example, a carrier ship is also illustrated near the module in FIG. 2, said ship being designated for example by general reference 11.

Figure 3:
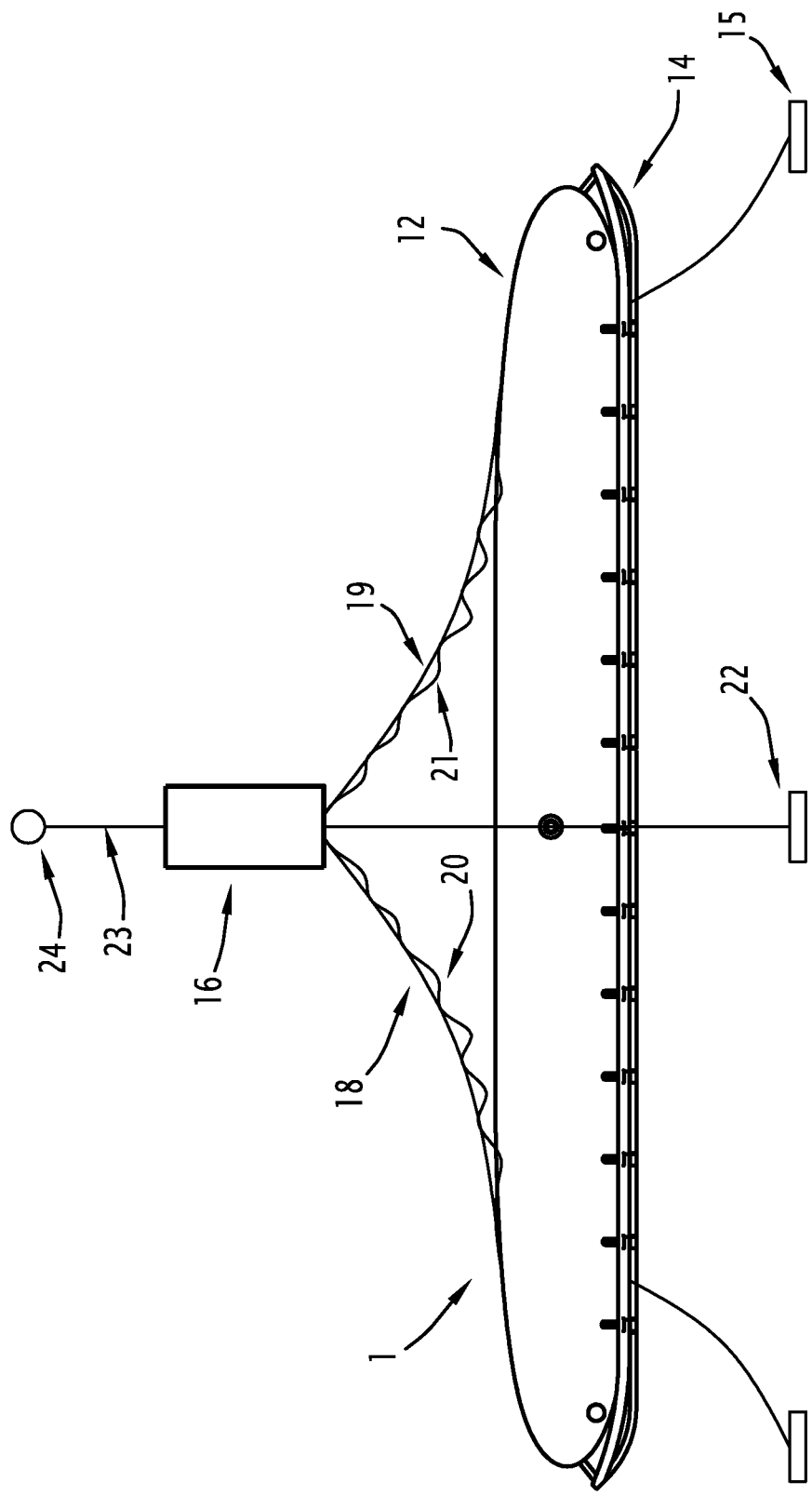
FIG. 3 shows a general side view of an electricity generation module according to the invention.
Figure 4:
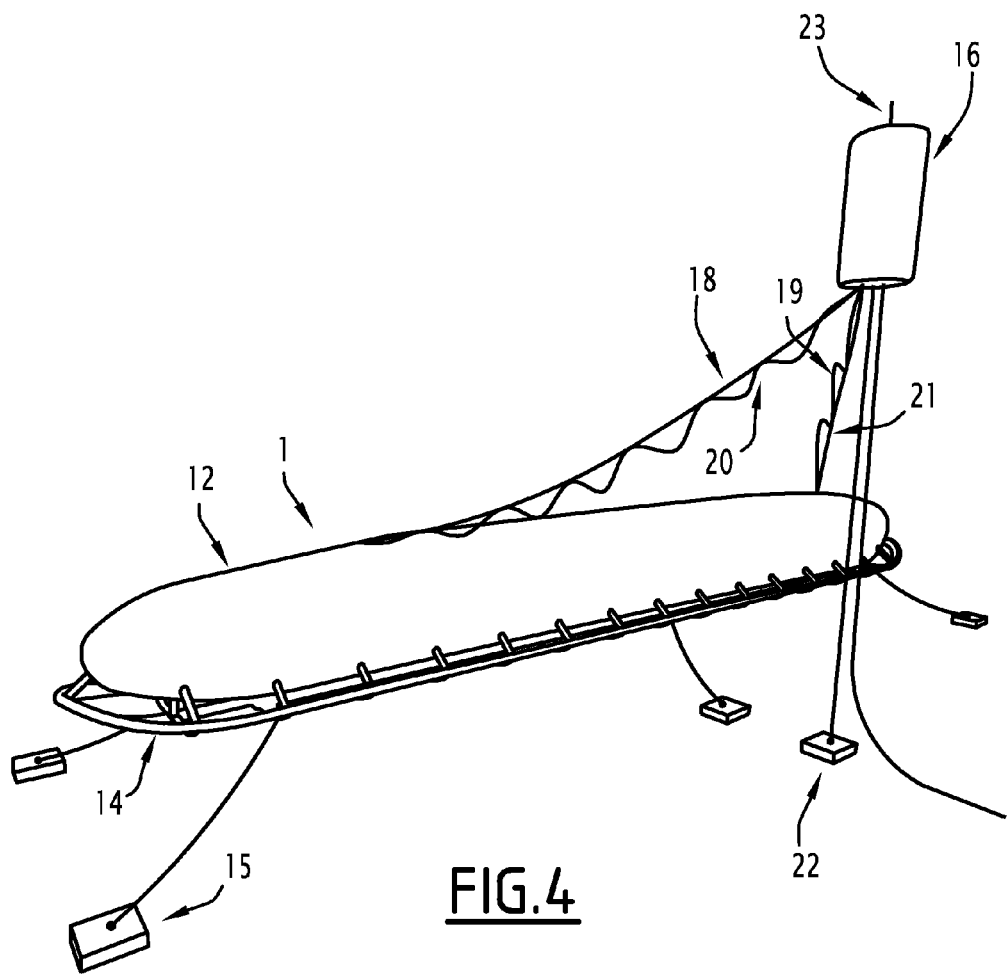
FIG. 4 shows a perspective view of the module illustrated in FIG. 3.

These different elements are also illustrated in FIGS. 3 and 4, in which the module designated by general reference 1 is shown, as well as elongate cylindrical casing designated by general reference 12, the base 14 thereof, the anchoring means 15 on the bed, and the submersible electrical connection unit 16.

This unit will be described in more detail hereafter, and we will simply note for the moment that this unit is connected by means of carrier or support cables, for example 18 and 19, to the underwater module 1, said carrier or support cables being adapted to receive and support electric cables designated by general references 20 and 21, extending between the module and the submersible connection unit 16.

It will also be noted that this unit 16 is associated with anchoring means on the bed designated by general reference 22 in these figures and is also associated with one end of a cargo runner designated by general reference 23, the other end of which comprises a signal buoy designated by general reference 24, adapted to float on the surface of the water and thereby allowing the standby means, for example such as the ship 11, to identify and recover said connection unit so as to allow an intervention thereon.

As illustrated in these figures, means for anchoring the module on the bed of the water body can be regularly distributed around said module.

Figure 5:
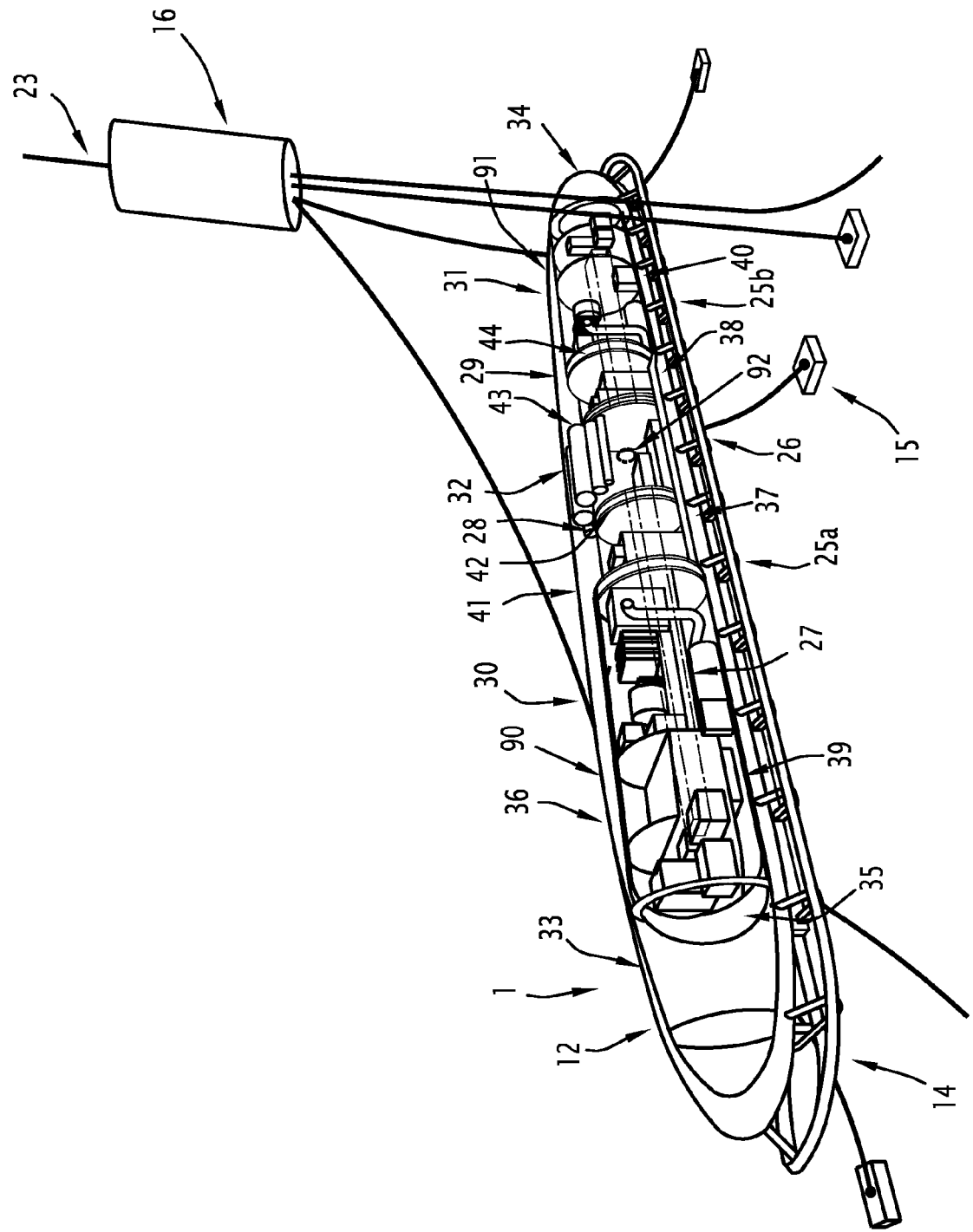
FIG. 5 shows one such electricity generation module with cutaway portions and in transparency view illustrating the inner structure thereof.

In reference to FIG. 5, where a more detailed view is provided of the inside of the electricity generation module according to the invention, one can see that integrated in the elongate cylindrical casing 12 is an electricity generation unit comprising a nuclear boiler, associated with electricity generation means.

In fact, two electricity generation units are positioned symmetrically on either side of the central transverse plane of the casing 12, along the longitudinal axis thereof.

These units are designated by general references 25a and 25b in FIG. 5 and can for example be identical generation units arranged symmetrically.

These can then be placed on either side of a service module shared by the two electricity generation units, which itself is placed at the center of the casing 12.

This service module is designated by general reference 26 in FIG. 5.

It will also be noted that at least one service passage extending from one end of the casing 12 to the other, passing through said service compartment 26 and serving the different means of each electricity generation unit 25a and 25b, to allow one or more operators to intervene therein, can also be considered, said service passage being designated by general reference 27 in FIG. 5 and being protected traditionally in this type of application to guarantee operator safety.

In fact, in FIG. 5, one can generally see the nuclear boiler designated by general references 28 and 29 of the electricity generation units 25a and 25b and the electricity generation means 30 and 31, respectively, of those units.

In the electricity generation module according to the invention, one of the ends of the nuclear boiler 28 and 29 is alongside the service compartment 26. As in fact illustrated, one of the ends of the nuclear boiler means 28 and 29 is alongside the service compartment 26, on each side thereof, while the electricity generation means 30 and 31, respectively, are alongside the other end of said boiler means, symmetrically.

The different elements in the composition of these various means not being the subject-matter of the invention, they will not be described in more detail hereafter.

It will simply be noted that traditionally, these various means then comprise a nuclear boiler, exchangers, turbo-alternators, auxiliary components of the secondary loop, electric batteries, high-voltage electric plants, etc.

The service compartment 26 can comprise different pieces of equipment traditional in this type of application, as well as adjusters making it possible to adapt the apparent weight of the module, these adjusters being designated by general reference 32 in FIG. 5.

It will also be noted that the ends of the casing 12 comprise ballast means 33 and 34, respectively, making it possible to maneuver the module, in particular during its diving and surfacing phases, or others.

This maneuver can also be assisted by propulsion nacelle means placed on the sides of the casing 12 and for example assuming the form of electric motorization pods, traditionally.

These different elements can be remotely controlled from the control/command post, for example based on land.

As also illustrated, the casing 12 can have a double hull, i.e. an inner hull designated by general reference 35 in FIG. 5, in which compartments are defined for receiving the nuclear boiler means and the electricity generation means, and a protective outer hull designated by general reference 36.

The compartments intended to receive the nuclear boiler means are designated by general references 37 and 38, respectively, while the compartments intended to receive the electricity generation means are designated by general references 39 and 40, respectively.

It will also be noted that these different compartments can be separated by cofferdams such as, for example, the cofferdams designated by general references 41, 42, 43 and 44, respectively, making it possible to ensure isolation of the compartments 37 and 38, respectively, designed to receive the nuclear boiler means, on the one hand of the service compartment 26 and on the other hand of the compartments 39 and 40 designed to receive the electricity generation means.

As previously described, each production unit is connected to the external electricity distribution post by its own electric cables. This then allows each generation unit to be independent.

Figure 6:
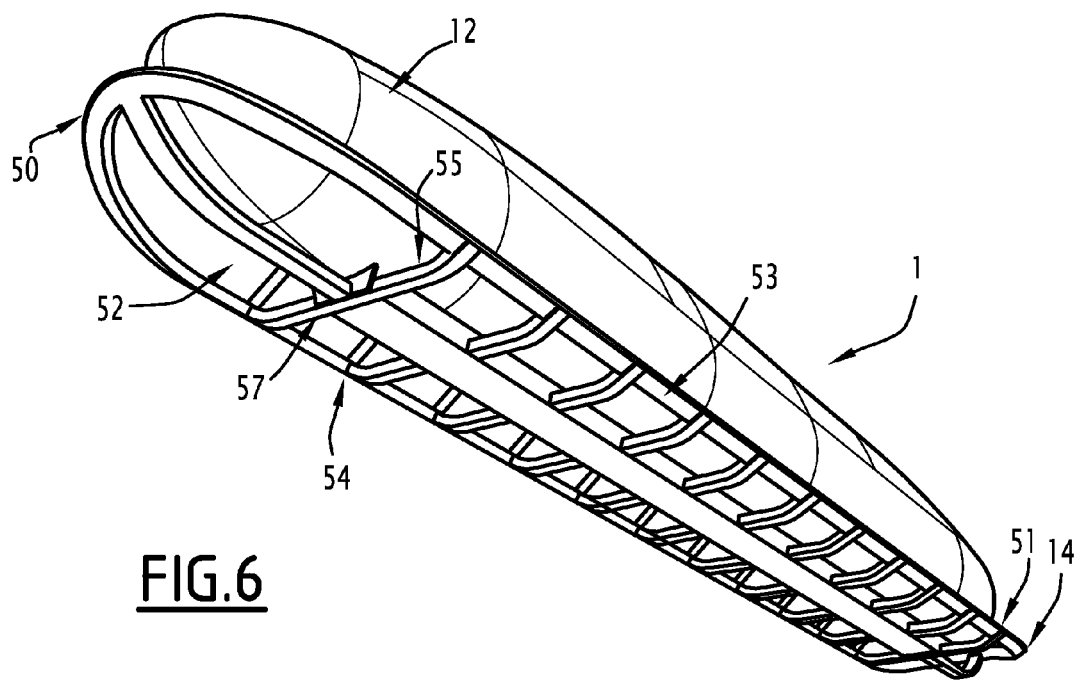
FIGS. 6, 7 and 8 show different perspective views of the module according to the invention.
Figure 7:
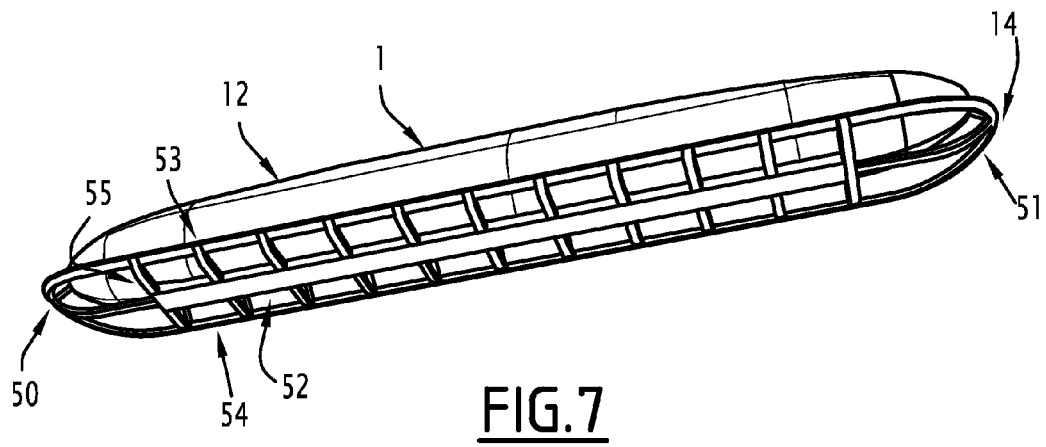
Figure 8:
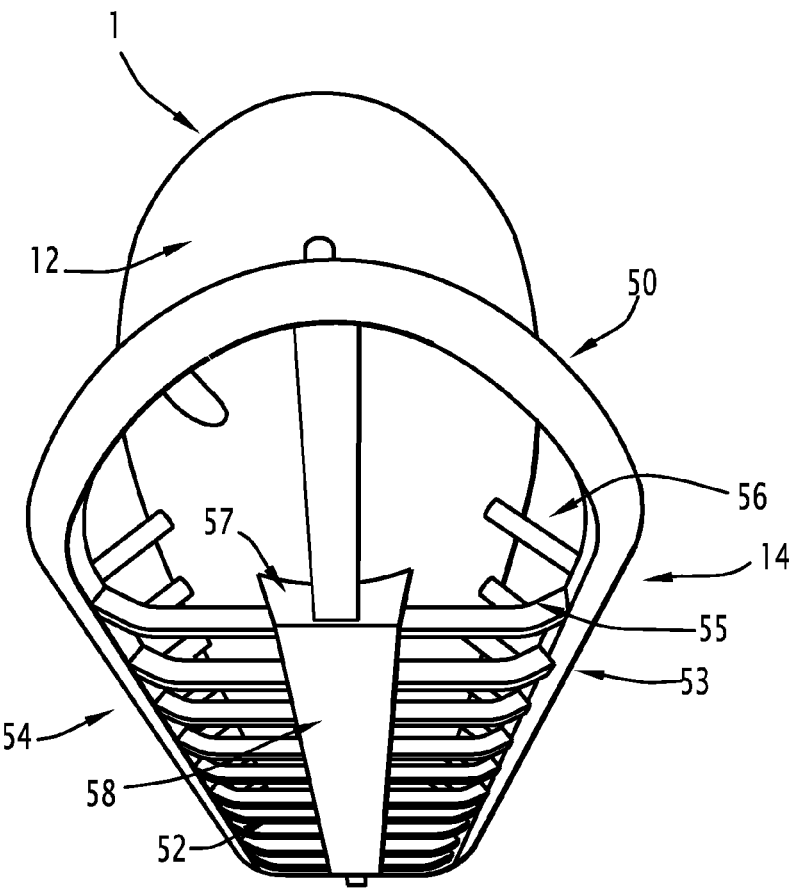
Figure 9:
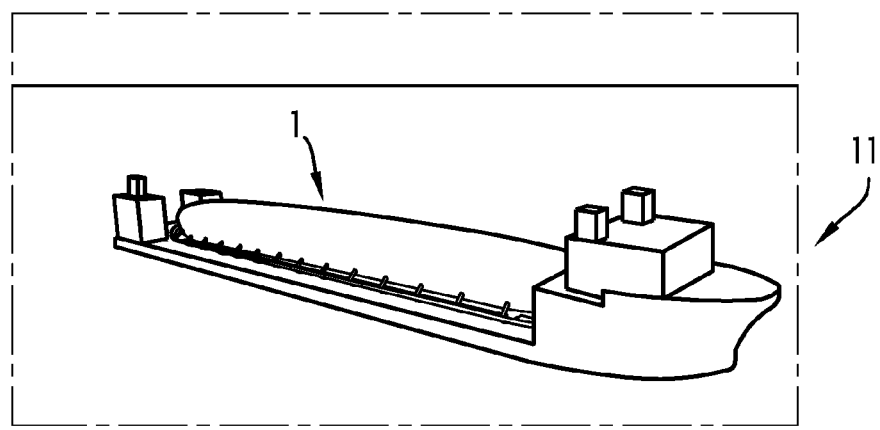
FIG. 9 illustrates a module according to the invention placed on the bridge of a standby carrier ship.

As also previously indicated, the lower part of the casing 12 of the electricity generation module 1 is equipped with a base 14 illustrated in more detail in FIGS. 6, 7 and 8 allowing it to rest on the bed of the water body or, as illustrated in FIG. 9, on the bridge of the standby carrier ships such as the ship 11.

One embodiment of this base is illustrated in more detail in FIGS. 6, 7 and 8, and assumes the general form of a sledge extending from one end of the casing 12 to the other, and the ends of which are bent into the shape of a spatula at each end of the casing.

In fact, each end 50 and 51, respectively, of these sledge means is configured in the shape of a spatula at each end of the casing 12, which in particular makes it possible to resolve the various problems of placing the module on the sea bottom.

In fact, these sledge means comprise a beam-based structure including a central beam designated by general reference 52 in these figures, and two side beams designated by general references 53 and 54.

These beams are connected to one another by reinforcing and connecting arms, one of which is for example designated by general reference 55 in these figures, and their ends are bent and curved to be fastened to one another at the spatula-shaped end of each end of the casing means of the module.

Furthermore, the side beams are connected to the electricity generation module by support columns, one of which is for example designated by general reference 56 in FIG. 8.

As more clearly visible in FIG. 8, the central beam 52 can also comprise support block means of the electricity generation module, one of which is for example designated by general reference 57 in that figure.

This central beam 52 can also comprise ballast means for example placed in the lower portion of said beam, said ballast means being designated by general reference 58 and having any traditional structure in that field.

It will also be noted that the base 14 in sledge form can comprise zones for absorbing the length variations of the casing 12, related to the pressure variation applied thereon when said casing is submerged or surfaced.

It is known that the length of such modules, which can be several tens of meters, can vary as a function of the submersion depth, and therefore the pressure applied on said module.

Figure 15B:
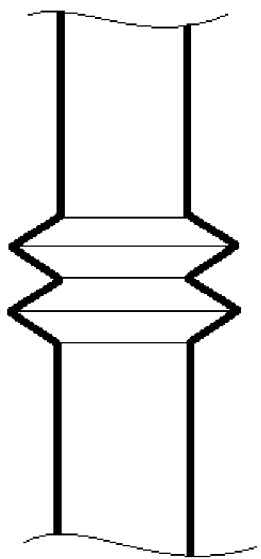
FIGS. 15a and 15b show examples of zones for absorbing the length variations of the module.
Figure 15A:
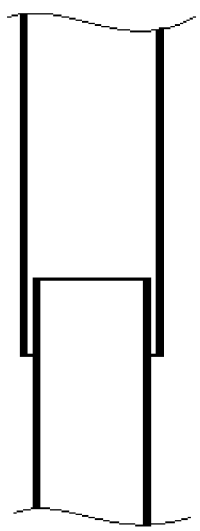

The zones for absorbing the length variations of the module can, for example, be formed by telescoping portions of the beams, such as shown in FIG. 15a, or by elastically deformable bellows portions thereof, such as shown in FIG. 15b.

Of course, other embodiments can be considered.

The module according to the invention can also be equipped with passive securing means in case of problems in the nuclear boiler.

In fact, it may be essential at one time or another, in particular in case of serious damage, to evacuate the residual heat therefrom, while preserving the environment of the module.

To that end, in the module according to the invention, the casing comprises, in the upper portion and the lower portion thereof, and in the zone in which the nuclear boiler is placed, openings for circulating cooling water thereof.

Figure 10:
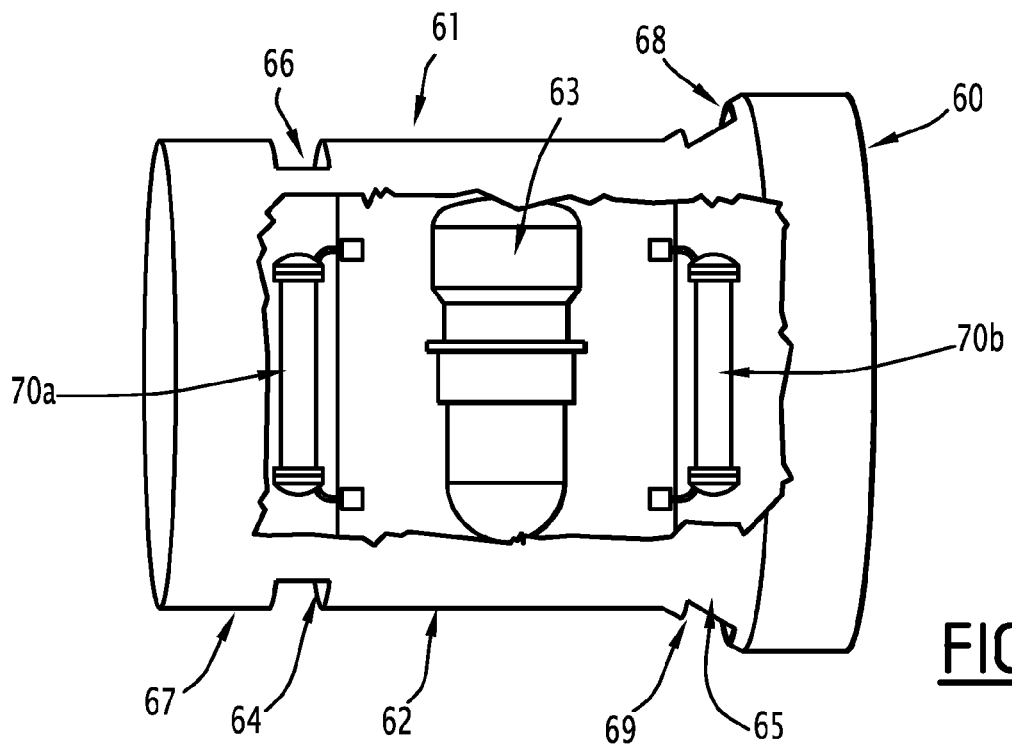
FIG. 10 illustrates a detail of an underwater electricity generation module according to the invention, showing one embodiment of means for securing the nuclear boiler included therein.
Figure 11:
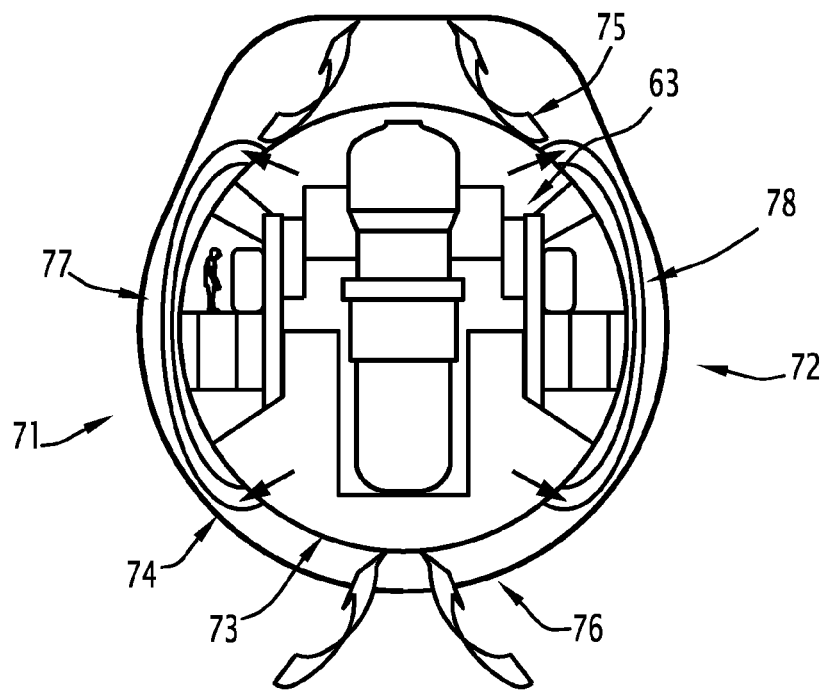
FIG. 11 shows a cross-sectional view of part of one such module illustrating an alternative embodiment of said security means, FIG. 12 diagrammatically illustrates the connection of electric cables associated with one such electricity generation module.

Two embodiments of these securing means are provided in FIGS. 10 and 11, respectively.

It will be noted that these openings can for example be associated with grates, or with flaps able to be moved between open and closed positions thereof.

In fact, the nuclear boiler can also be connected to heat exchanger means placed on the cooling water circulation path between the water circulation openings formed in the casing, the upper portion and the lower portion of the nuclear boiler then being connected to the upper portion and the lower portion of the exchanger.

FIG. 10 illustrates a first embodiment of said securing means, in which one can see part of an underwater electricity generation module, designated by general reference 60 in that figure, said module also comprising a casing designated by general reference 61 in which a compartment 62 is delimited for receiving a nuclear boiler designated by general reference 63.

This compartment 62 is separated from the other compartments of the casing by cofferdams 64 and 65, respectively, provided on each side of said compartments 62.

As is traditional, said cofferdams 64 and 65 are in fact free spaces.

Openings 66, 67, 68 and 69, respectively, are then formed in the upper and lower portions of the casing 61 opposite said cofferdams and in fluid communication therewith to allow water to circulate therein between the lower openings and the upper openings of the casing.

It will be noted that heat exchangers 70a and 70b, respectively, can then be placed in said cofferdams and are connected to the upper and lower portions, respectively, of the nuclear boiler 63 to evacuate the residual heat thereof into the water.

In the illustrated example, said exchanger means comprise at least two exchangers placed on either side of the nuclear boiler in the cofferdams.

Such a structure then makes it possible to evacuate heat over the long term and does not require external energy due to the natural water circulation.

According to the example embodiment illustrated in FIG. 11, an underwater module 71 still comprises a casing designated by general reference 72 in which the nuclear boiler 63 is arranged. However, in this embodiment, the casing 72 comprises a double hull, i.e. an inner hull designated by general reference 73 and an outer hull designated by general reference 74, spaced away from the inner hull.

Water circulation openings 75 and 76, respectively, are then formed in the outer hull above and below, respectively, the zone in which the nuclear boiler 63 is placed. This then allows the water to circulate around said nuclear boiler, and in particular around the heat exchanger means designated by general references 77 and 78, respectively, placed on either side of the nuclear boiler between the two hulls of the casing.

These exchanger means are then still connected to the nuclear boiler.

As previously indicated, each electricity generation unit is connected by electric cables to an external distribution post placed on land, for example, through a submersible connection unit that is easily accessible.

In fact, such a unit can be used to avoid having to access the module each time one wishes to intervene on the connection means.

Figure 12:
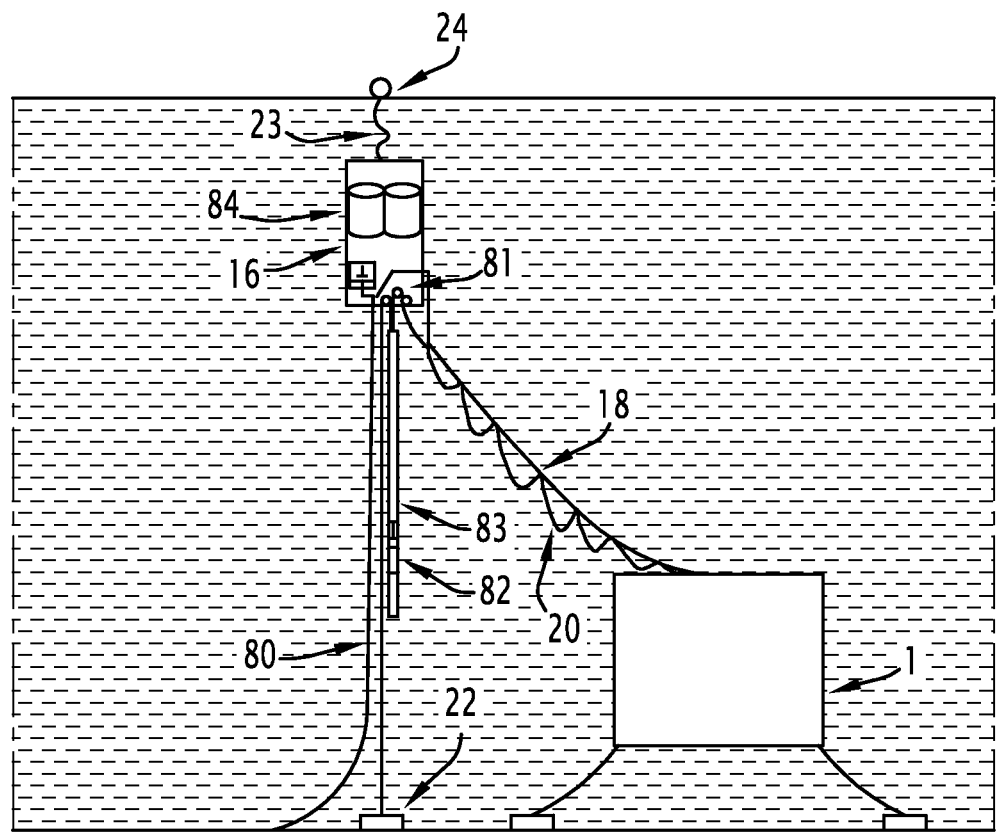

Such a structure is generally illustrated in FIG. 12, in which one can see the electricity generation module 1, which is shown at diagrammatically in that figure, the connection unit 16, the cargo runner 23, the signal buoy 24, one of the carrier cables such as, for example, cable 18, and the corresponding electric cable, such as, for example, the corresponding cable 20.

In fact, this cable 20 as a first electric cable ensuring the electric connection of the module, more particularly of the or each electricity generation unit of said module, to the submersible connection unit 16, in which said first electric cable is connected to a second electric cable designated by general reference 80 in FIG. 12, making it possible to connect the assembly to the external electricity distribution post.

It will also be noted that cables or optic fibers making up information transmission means can be used between the control/command center remote from the module, for example land-based, and the electricity generation module strictly speaking to steer/control the operation thereof.

In fact and as illustrated, one of the ends of the carrier cable 18 is connected to the electricity generation module, and said carrier cable passes over return means for example made up of pullies, for example 81, of the submersible connection unit 16, to extend under that unit toward the bed of the body of water. The other end of said carrier cable 18 then comprises counterweight means for stabilizing said connection unit in position.

Said counterweights are for example designated by general reference 82 in this figure and are mounted slidingly movable in a protective sheath designated by general reference 83, extending under the unit.

This then makes it possible to stabilize said assembly in position while preventing any cables from getting tangled.

It will also be noted that the submersible connection unit 16 can comprise means forming an adjuster to adapt its apparent weight, said means being designated by general reference 84 in FIG. 12, for example to allow it to be submerged between two bodies of water.

It will lastly be noted that a submersible connection unit like that just described can be associated with each generation unit of an electricity generation module or a shared submersible connection unit can be associated with the two generation units of each electricity generation module.

Each unit also for example comprises electricity supply means. This energy can be supplied by the outside environment in nominal operation. Redundantly, backup power means can also be provided, such as, for example, batteries or any other storage means, fuel cells, for example activated by the sea water if necessary, etc. to guarantee a minimal security operation of said unit, such as, for example, surfacing assistance.

It will also be noted that the operation of this unit can be controlled/commanded from outside, said unit them being connected to the environment by wired connecting means, controlled by acoustic or other signals.

In the preceding figures, and in particular in FIG. 5, it is also that illustrated that the module according to the invention can be equipped with various evacuation locks for the operators, distributed in different locations of the casing.

Thus, for example, such locks designated by general references 90 and 91 are illustrated in FIG. 5 and are for example placed at the ends of the casing to emerge in the compartments for receiving the electricity generation means.

Likewise, the service compartment 26 is provided with an access lock for operators and also making it possible to insert/remove equipment from the casing.

Figure 13:
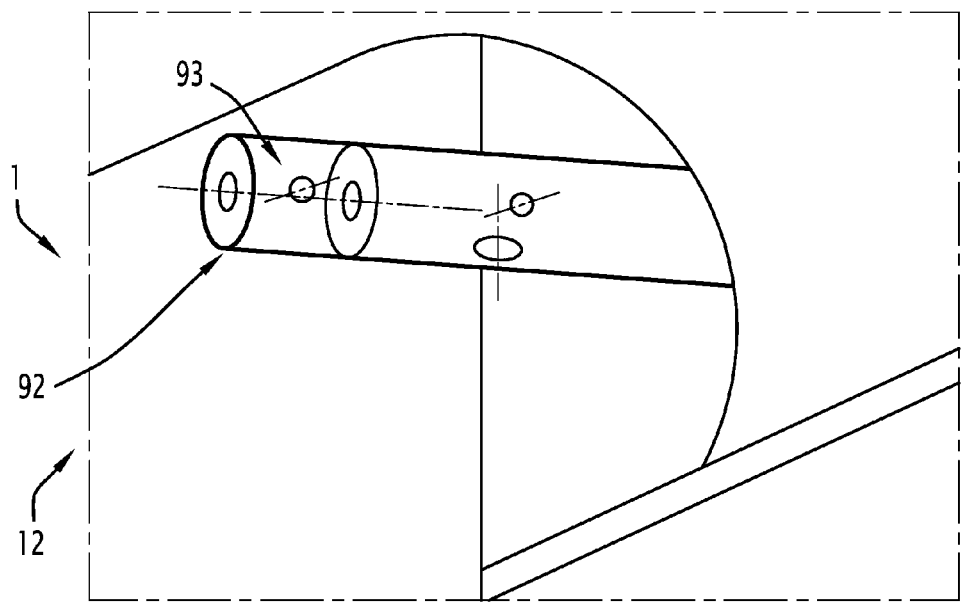
FIG. 13 shows a perspective side view of an entrance lock included in an electricity generation module according to the invention.
Figure 14:
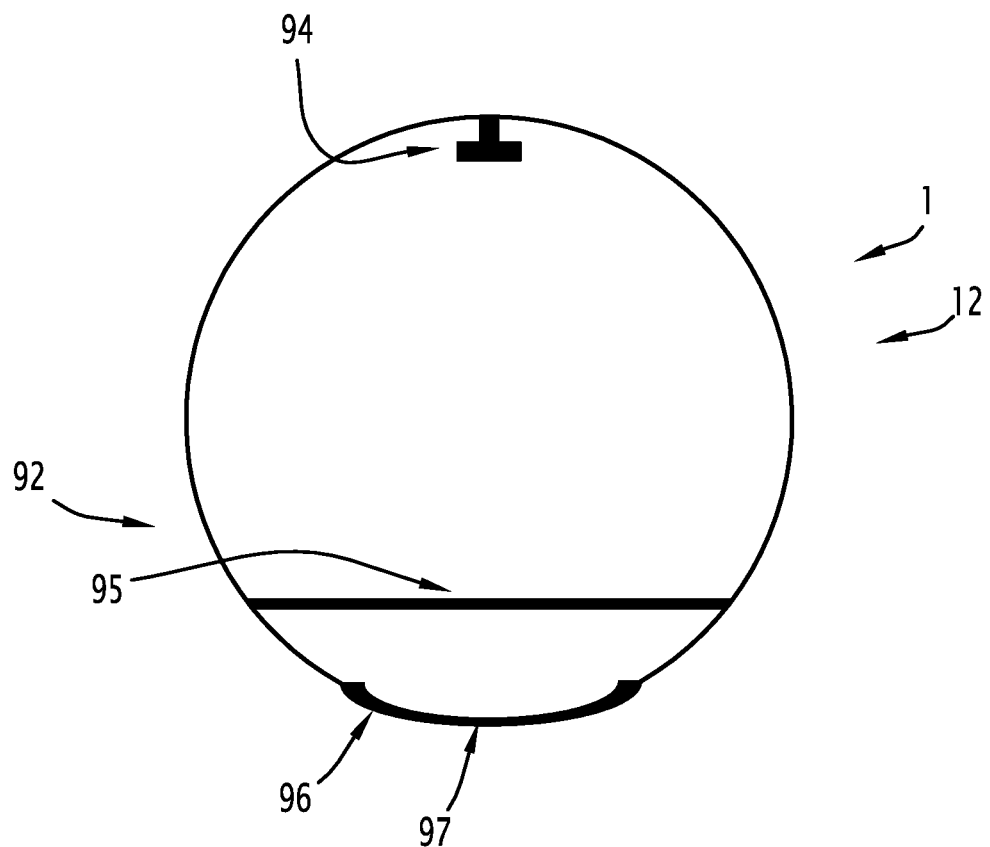
FIG. 14 shows a diagrammatic cross-sectional view illustrating the structure of one such entrance lock.

This lock is designated by general reference 92 in FIG. 5 and is illustrated in more detail in FIGS. 13 and 14.

In fact, the casing 12 of the electricity generation module 1 can be seen in these figures, and said casing comprises at least one horizontal logistical access lock emerging in the service compartment 26 of the electricity generation module, said locks still being designated by general reference 92.

This lock is equipped with different access panels, for example from the outside or inside of the module, and is also equipped with a decompression chamber for the operators, said decompression chamber being designated for example by general reference 93.

As illustrated in more detail in FIG. 14, the ceiling of the lock 92 can also be equipped with a rail such as the suspension rail 94 for the load handling means, which can then be placed on a horizontal floor such as, for example, the floor 95, provided at the bottom of said lock.

The bottom of the lock can also have a gap such as, for example, the gap 96 illustrated in FIG. 14, emerging in the service compartment 26 and covered by a retractable flap such as the flap designated by general reference 97.

This flap can be a flap bolted on the rest of said lock.

Of course, still other embodiments can be considered.

The lock is also equipped with other opening panels or doors allowing exchanges between the different zones thereof.

Several particular points can be noted relative to the decompression chamber. In fact, said chamber can be accessible from the inside of the lock or the outside. In submersion, it may be accessible under atmosphere.

The decompression chamber is designed to withstand the submersion pressure and can be accessible during submersion by divers.

The decompression chamber can be emptied by pumping, the work of which is reduced by pressurizing the water to be discharged with a pressurized gas (which can be air) that replaces the expelled water. This makes it possible, inter alia, for the diver to begin the decompression procedure (desaturation of the nitrogen in the organic tissues) while avoiding barotraumatic risks through subtle control of the in situ atmospheric pressure.

One can then see that such an electricity generation module structure has a certain number of advantages, in particular in terms of its insensitivity to human attacks such as sabotage or ill-intentioned acts, or natural attacks, for example related to the environment, such as, for example, storms, earthquakes, and lightning. Furthermore, water being inert, it provides natural protection in case of problems.

Furthermore, such an electricity generation module can be manufactured serially relatively easily, for example on a naval worksite, and can be moved to be implemented in a required location, such as, for example, a location having just suffered an accident and that needs an independent electricity supply.

The electricity generation units can be manufactured at the same time and in parallel, for example, then joined to the end of the service compartment, which makes it possible to reduce the manufacturing time for such a module.

Such a module also has a relatively reduced size, while offering the possibility of having reasonable power, and requires a relatively small investment, in particular relative to a traditional land-based nuclear electricity generation plant.

It may be built relatively quickly and benefit from serial manufacture.

It also does not require a crew inasmuch as it can be commanded/controlled remotely.

Operators may, however, intervene inside the module owing to the lock, the latter also making it possible to insert or remove relatively large loads from said module.

The particular structure of the base in the form of a sledge also allows the module to be placed independently on the bed of the water body or to be transported by a ballastable carrier ship or a dock.

This particular structure in the form of a sledge whereof the ends are curved in the form of spatulas allows the module to be placed almost anywhere, including with a trim and list of several degrees, and guaranteeing the stability of the module while giving it a good mechanical strength.

This also makes it possible to avoid using external assistance to place these modules, as with the modules of the state of the art.

The particular structure of this base also makes it possible to ensure sufficient strength of the module to avoid any deformation, or break.

The passive security means make it possible to optimize the security of the nuclear boiler by evacuating the residual heat from the nuclear core over the long term while guaranteeing environmental protection.

The system also works without an external energy source by simple natural circulation of water heating up in contact with the exchanger means, or the wall of the corresponding compartment.

The electric connection unit makes it possible to connect or disconnect, or generally to intervene on, an electric cable connected to the underwater module, without it being necessary to intervene on the latter, which may for example be submerged at a relatively significant depth.

The standby means, such as a standby ship, for example, can on the one hand identify the signal buoy of the connection unit, and on the other hand raise the latter out of the water so as to allow an intervention such as a connection, a disconnection, or other operation of the cables, and return said unit to the water after that intervention.

Lastly, the large lock making it possible to access the service compartment of the electricity generation module makes it possible to insert or remove relatively large equipment therein.

The invention claimed is:

1. An underwater electricity generation module comprising:
   an elongate cylindrical casing (12) incorporating therein an electricity generation unit (25a, 25b) comprising a nuclear boiler (28, 29) associated with electricity generation means (30, 31) connected to an external electricity distribution post (7) by electric cables (6), a lower portion of the casing (12) being provided with a base (14) that rests on a bed of a water body and anchoring means (15) for anchoring the module to the bed,
   wherein the base (14) is a sledge which extends from one end of the casing (12) to the other and the ends (50, 51) of which are curved in the form of a spatula at each end of the casing (12), and including zones for absorbing variations in the length of the casing (12), linked to the variation in the pressure applied thereto when submerged or surfaced.

2. The underwater electricity generation module according to claim 1, wherein the zones for absorbing the length variations comprise telescoping portions of the beams.

3. The underwater electricity generation module according to claim 1, wherein the zones for absorbing the length variations comprise elastically deformable bellows portions of the beams.

4. The underwater electricity generation module according to claim 1, wherein the sledge includes a longitudinal central beam that extends between the ends of the sledge.

5. An underwater electricity generation module comprising:
   an elongate cylindrical casing (12) incorporating an electricity generation unit (25a, 25b) comprising a nuclear boiler (28, 29) associated with electricity generation means (30, 31) connected to an external electricity distribution post (7) by electric cables (6), a lower portion of the casing (12) being provided with a base (14) that rests on a bed of a water body and anchoring means (15) for anchoring the module to the bed,
   wherein the base (14) is a sledge which extends from one end of the casing (12) to the other and the ends (50, 51) of which are curved in the form of a spatula at each end of the casing (12), and including zones for absorbing variations in the length of the casing (12), linked to the variation in the pressure applied thereto when submerged or surfaced, and
   wherein the sledge includes a beam-based structure including a central beam (52) and two side beams (53, 54), connected to one another by reinforcing and connecting arms (55), and the ends of which are bent and curved to be fastened to one another at the spatula-shaped end at each end of the casing (12).

6. The underwater electricity generation module according to claim 5, wherein the two side beams (53, 54) are connected to the casing (12) by support columns (56).

7. The underwater electricity generation module according to claim 6, wherein the central beam (52) comprises support block means (57) for the casing (12).

8. The underwater electricity generation module according to claim 6, wherein the central beam (52) comprises ballast means (58).

9. The underwater electricity generation module according to claim 5, wherein the central beam (52) comprises support block means (57) for the casing (12).

10. The underwater electricity generation module according to claim 9, wherein the central beam (52) comprises ballast means (58).

11. The underwater electricity generation module according to claim 5, wherein the central beam (52) comprises ballast means (58).

12. The underwater electricity generation module according to claim 5, wherein the zones for absorbing the length variations comprise telescoping portions of the beams.

13. The underwater electricity generation module according to claim 5, wherein the zones for absorbing the length variations comprise elastically deformable bellows portions of the beams.

* * * * *